US012638139B2

(12) United States Patent
Toureille et al.

(10) Patent No.: US 12,638,139 B2
(45) Date of Patent: May 26, 2026

(54) TANK COMPRISING INNER AND OUTER ENCLOSURES AND AT LEAST ONE DUCT PASSING THROUGH AT LEAST ONE DEFORMABLE CLOSURE PLATE

(71) Applicant: Airbus Operations SAS, Toulouse (FR)

(72) Inventors: Nicolas Toureille, Toulouse (FR); Chloé Mesic, Toulouse (FR); Laure Moretti, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 58 days.

(21) Appl. No.: 18/644,955

(22) Filed: Apr. 24, 2024

(65) Prior Publication Data

US 2024/0360961 A1 Oct. 31, 2024

(30) Foreign Application Priority Data

Apr. 28, 2023 (FR) ...................................... 2304309

(51) Int. Cl.
*F17C 13/06* (2006.01)

(52) U.S. Cl.
CPC ...... *F17C 13/06* (2013.01); *F17C 2205/0305* (2013.01); *F17C 2205/0367* (2013.01); *F17C 2270/0189* (2013.01)

(58) Field of Classification Search
CPC .............. F17C 13/06; F17C 2205/0305; F17C 2205/0367; F17C 2270/0189; F17C 2201/0109; F17C 2201/054; F17C 2201/056; F17C 2203/012; F17C 2203/018; F17C 2203/03; F17C 2203/0629; F17C 2209/228; F17C 2209/234; F17C 2221/012; F17C 2223/0161; F17C 2223/033;
(Continued)

(56) References Cited

U.S. PATENT DOCUMENTS 7,344,045 B2 3/2008 Harper et al.
2014/0131360 A1 * 5/2014 Aoki ......................... F17C 3/02 220/567.2

(Continued)

FOREIGN PATENT DOCUMENTS

CN 114857487 A * 8/2022 ................ F17C 3/04
KR 20190086905 A * 7/2019 ................ F17C 7/04

(Continued)

OTHER PUBLICATIONS

English Machine Translation of KR-20190086905-A (Year: 2019).*

(Continued)

*Primary Examiner* — Laura E. Parker
(74) *Attorney, Agent, or Firm* — Greer, Burns & Crain, Ltd.

(57) ABSTRACT

A tank comprising an outer enclosure, an inner enclosure positioned in the outer enclosure, and at least one duct passing through first and second walls connected respectively to the outer and inner enclosures. The first and/or second walls comprises at least one deformable zone interposed between, on the one hand, an attachment zone which connects the wall and the outer or inner enclosure and, on the other hand, a connection zone which comprises a connection connecting the wall and the duct. Also an aircraft with such a tank.

14 Claims, 8 Drawing Sheets

(58) Field of Classification Search
CPC .......... F17C 2260/011; F17C 2260/036; F17C 2203/01; F17C 2203/014
USPC .................... 220/560.06, 560.05, 560.1, 901
See application file for complete search history.

(56) References Cited

U.S. PATENT DOCUMENTS

2017/0130900 A1 5/2017 Strange et al.
2022/0042651 A1 2/2022 Fournel
2023/0159165 A1* 5/2023 Vercamer ................. B64D 1/00 220/560.1
2023/0321607 A1* 10/2023 Meyer-Blumenroth ..................... B28B 1/001 210/510.1

FOREIGN PATENT DOCUMENTS

KR 20220134282 A * 10/2022 .............. F17C 3/085
NL 8801044 A 11/1989
SU 1502897 A1 8/1989

OTHER PUBLICATIONS

English Machine Translation of KR-20220134282-A (Year: 2022).*
English Machine Translation of CN-114857487-A (Year: 2022).*
French Search Report for corresponding French Patent Application No. 2304309 dated Oct. 31, 2023.

* cited by examiner

TANK COMPRISING INNER AND OUTER ENCLOSURES AND AT LEAST ONE DUCT PASSING THROUGH AT LEAST ONE DEFORMABLE CLOSURE PLATE

CROSS-REFERENCES TO RELATED APPLICATIONS

This application claims the benefit of French Patent Application Number 2304309 filed on Apr. 28, 2023, the entire disclosure of which is incorporated herein by way of reference.

FIELD OF THE INVENTION

The present application relates to a tank comprising inner and outer enclosures and at least one duct passing through at least one deformable closure plate.

BACKGROUND OF THE INVENTION

According to an embodiment shown in FIG. 1, a hydrogen tank 10 comprises an outer enclosure 12, an inner enclosure 14 positioned in the outer enclosure 12, thermal insulation between the outer and inner enclosures 12, 14, and two diametrically opposite connection systems 16, 16' connecting the outer and inner enclosures 12, 14. In operation, because of the temperature and the storage pressure of hydrogen in the cryogenic state, the inner enclosure 14 may, depending on the situation, contract or expand more than the outer enclosure 12. Consequently, at least one of the two connection systems 16' is configured to allow movement of the inner enclosure 14 with respect to the outer enclosure 12 in a direction of movement. According to one arrangement, the first connection system 16 (the one on the left in FIG. 1) is rigid and does not allow any relative movement between the outer and inner enclosures 12, 14, whereas a second connection system 16' (the one on the right in FIG. 1) allows a relative movement between the outer and inner enclosures 12, 14.

According to an embodiment shown in FIG. 2, the first connection system 16 comprises a tubular interface 18 passing through the outer and inner enclosures 12, 14 and having a first end 18.1 opening out to the outside of the outer tank 12, and a second end 18.2 opening out to the inside of the inner tank 14, each of the outer and inner enclosures 12, 14 comprising a through-hole 12.1, 14.1 to allow the tubular interface 18 to pass through. The first connection system 16 comprises a first rigid connection 20 connecting the tubular interface 18 and the outer enclosure 12, and a second rigid connection 20' connecting the tubular interface 18 and the inner enclosure 14. According to one configuration, one of the first and second connections 20, 20' comprises at least one flange having a first wing pressed against the outer or inner enclosure 12, 14 and connected to the latter, and a second wing pressed against the tubular interface 18 and connected to the latter. In addition, the first connection system 16 comprises a first closure plate 22.1 closing the first end 18.1 of the tubular interface 18, and a second closure plate 22.2 closing the second end 18.2 of the tubular interface 18.

The hydrogen tank 10 comprises a plurality of ducts 24, 24' which pass through the first and second closure plates 22.1, 22.2 and which each have a first end 24.1, 24.1' opening into the inner enclosure 14. All of these ducts 24, 24' are rectilinear between the first and second closure plates 22.1, 22.2.

Each of the first and second closure plates 22.1, 22.2 comprises, for each duct 24, 24', an orifice 26 to allow the duct 24, 24' to pass through it. In line with each orifice 26, each duct 24, 24' is connected to the first or second closure plate 22.1, 22.2 by a weld seam 28 which connects the duct 24, 24' to the first or second closure plate 22.1, 22.2 in a sealed manner around the entire periphery of the duct 24, 24'.

In one embodiment, the materials of the various elements (enclosures, ducts, closure plates, connection systems) may be different: for example, metallic/composite.

In operation, taking into account:

the pressure in the inner enclosure 14, the difference in thermal expansion between the materials of the ducts 24, 24' and of the connection system 16, the very considerable difference in temperature between, on the one hand, the outer enclosure 12 and the first closure plate 22.1 and, on the other hand, the inner enclosure 14 and the second closure plate 22.2, the ducts 24, 24', the weld seams 28 and the inner and outer enclosures are subjected to considerable stresses that can damage them.

SUMMARY OF THE INVENTION

The present invention aims to overcome all or some of the aforementioned drawbacks.

To this end, the invention relates to a tank comprising an outer enclosure, an inner enclosure positioned in the outer enclosure, first and second connection systems connecting the outer and inner enclosures, a first wall connected to the outer enclosure, a second wall connected to the inner enclosure, and at least one duct passing through the first and second walls. Each of the first and second walls comprises at least one attachment zone connected to the inner or outer enclosure and, for each duct, an orifice through which the duct passes, and a connection zone surrounding the orifice and comprising a connection connecting the duct and the first or second wall.

According to the invention, at least one wall of the first and second walls comprises at least one deformable zone interposed between the attachment zone and the connection zone, the deformable zone being configured to allow the connection zone to move with respect to the attachment zone.

The deformable zone makes it possible to compensate for a dimensional variation between the first and second walls and to limit stresses on the connections in order to reduce the risks of damage to the latter.

According to another feature, each deformable zone describes a circle.

According to another feature, each deformable zone comprises at least one undulation describing a circle.

According to another feature, each deformable zone comprises a plurality of concentric undulations forming a bellows.

According to another feature, the wall has a first thickness outside the deformable zone(s) and a second thickness, less than the first thickness, in each deformable zone.

According to another feature, the wall comprises, for each connection zone, a deformable zone surrounding the connection zone.

According to another feature, the wall comprises a deformable zone surrounding a plurality of connection zones.

According to another feature, the attachment zone is in the form of a ring. In addition, the deformable zone and the attachment zone are concentric, with the deformable zone surrounding all the connection zones.

According to one configuration, the first connection system comprises:

a tubular interface passing through the outer and inner enclosures, connected thereto and having a first end opening out to the outside of the outer enclosure and a second end opening out to the inside of the inner enclosure, a first closure plate closing the first end of the tubular interface and comprising at least one deformable zone, a second closure plate closing the second end of the tubular interface and comprising at least one deformable zone.

According to another feature, each duct comprises an intermediate segment situated between the first and second walls and having an excess length between said first and second walls.

According to another feature, each intermediate segment has an axis which follows a trajectory in the form of a circular helix.

According to another feature, the tank comprises a plurality of ducts passing through the first and second walls, the helical trajectories of the intermediate segments of the different ducts having approximately the same helix axis.

The invention also relates to an aircraft comprising at least one tank according to one of the preceding features.

BRIEF DESCRIPTION OF THE DRAWINGS

Other features and advantages will become apparent from the following description of the invention, the description being given solely by way of example, with reference to the appended drawings, in which.

DETAILED DESCRIPTION OF THE PREFERRED EMBODIMENTS

Figure 1:
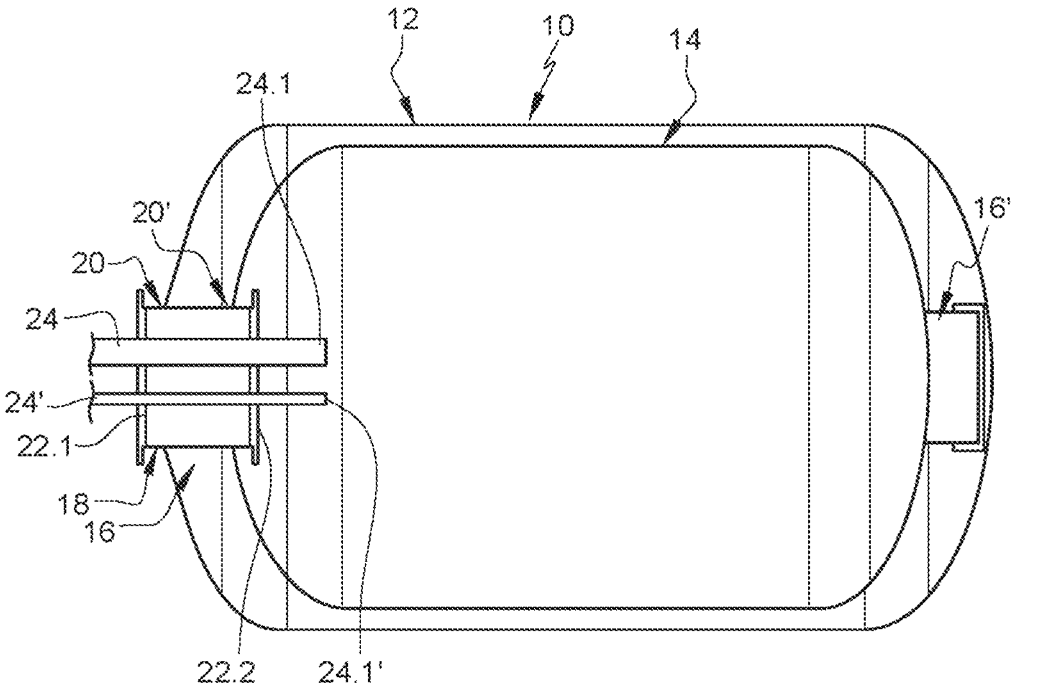
Fig. 1 (prior art)
FIG. 1 is a longitudinal section of a tank, illustrating an embodiment of the prior art.
Figure 2:
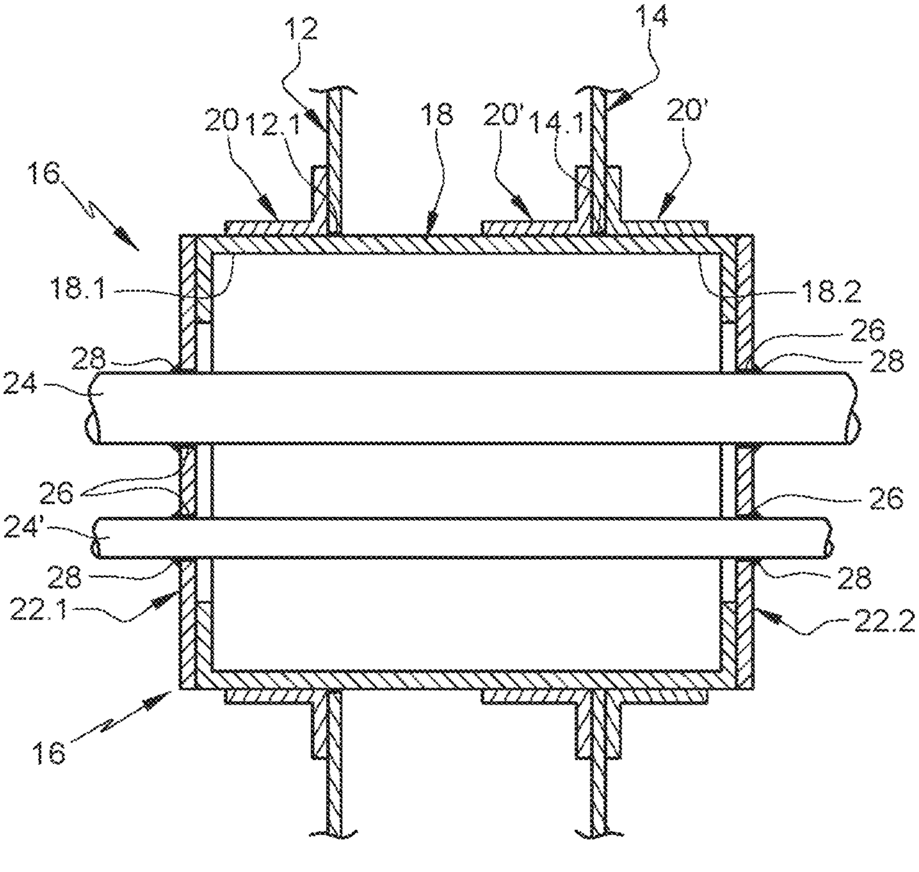
Fig. 2 (prior art)
FIG. 2 is a longitudinal section of a connection system, connecting outer and inner enclosures of the tank shown in FIG. 1, illustrating an embodiment of the prior art.
Figure 3:
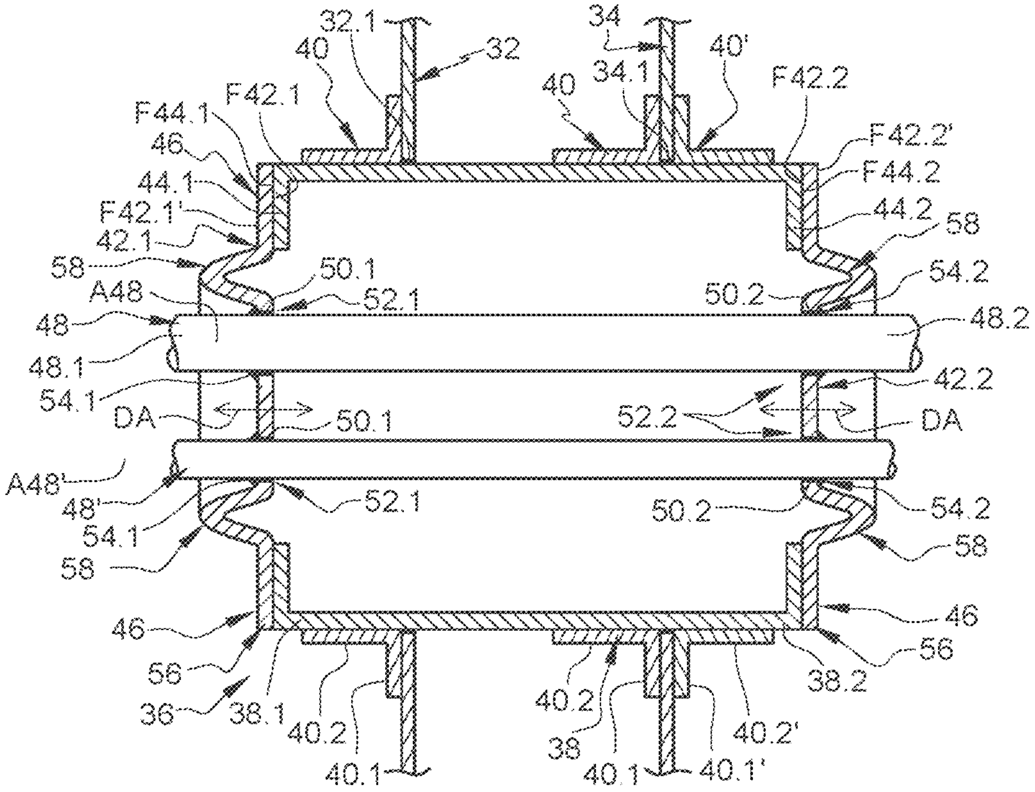
FIG. 3 is a longitudinal section of a connection system, connecting outer and inner enclosures of a tank, illustrating an embodiment of the invention.
Figure 4:
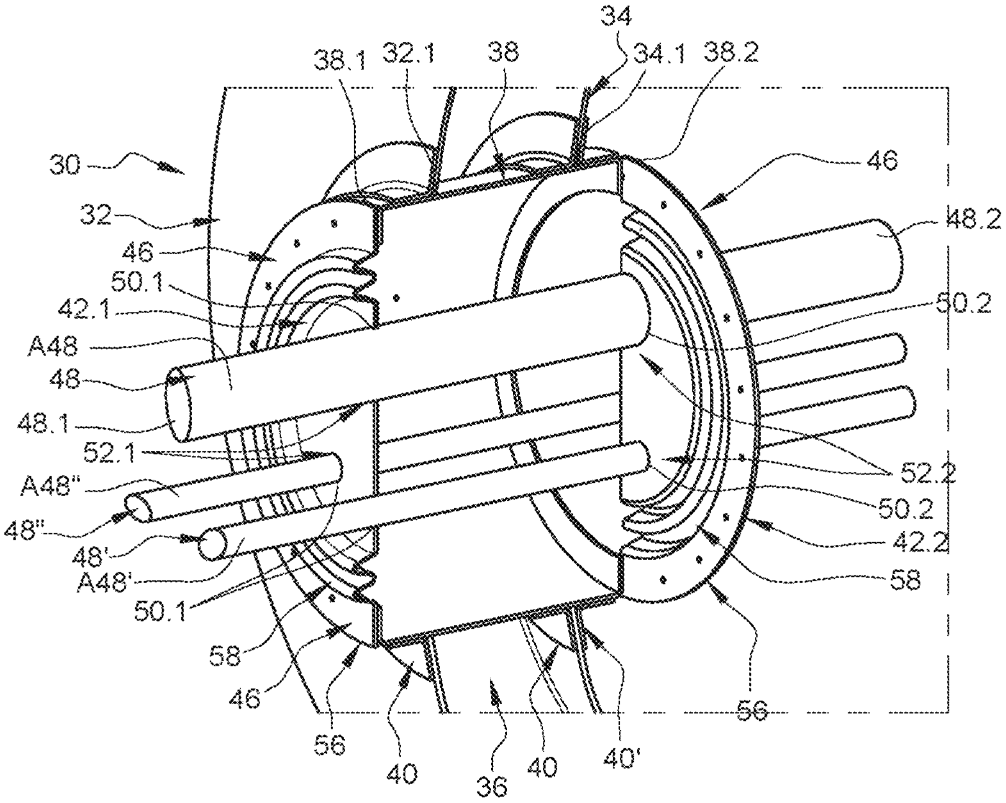
FIG. 4 is a perspective view of a connection system, connecting outer and inner enclosures of a tank, illustrating an embodiment of the invention.
Figure 5:
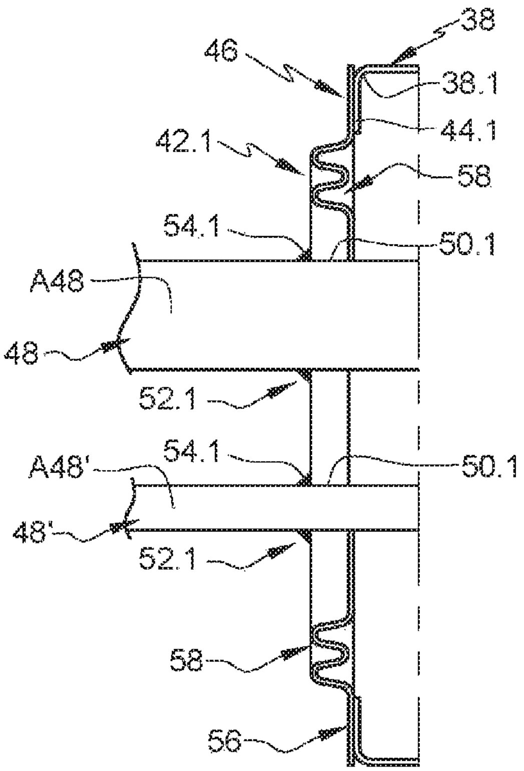
FIG. 5 is a cross section of a closure plate, illustrating an embodiment of the invention.
Figure 7:
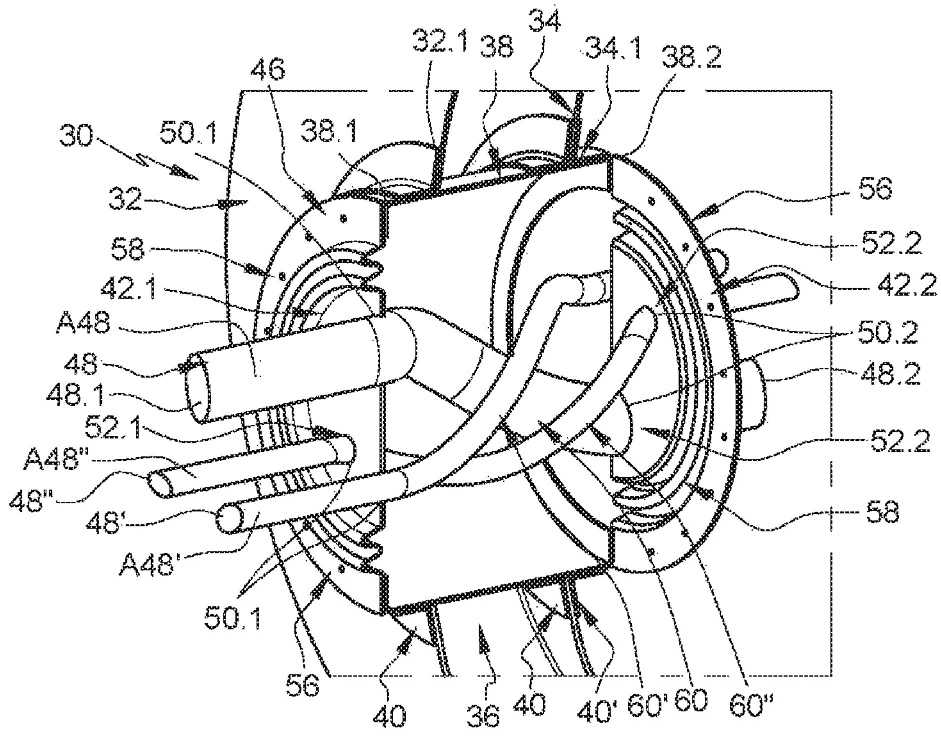

According to an embodiment shown in FIGS. 3, 4 and 7, a tank 30 comprises an outer enclosure 32, an inner enclosure 34 positioned in the outer enclosure 32, and two diametrically opposite connection systems 36 connecting the outer and inner enclosures 32, 34. According to one configuration, the tank 30 can comprise thermal insulation between the outer and inner enclosures 32, 34.

According to one arrangement, the first connection system 36 is substantially rigid, whereas the second connection system (not shown) allows a relative movement between the outer and inner enclosures 32, 34. The second connection system is configured to allow a relative movement, between the outer and inner enclosures 32, 34, oriented in a longitudinal direction.

Figure 8:
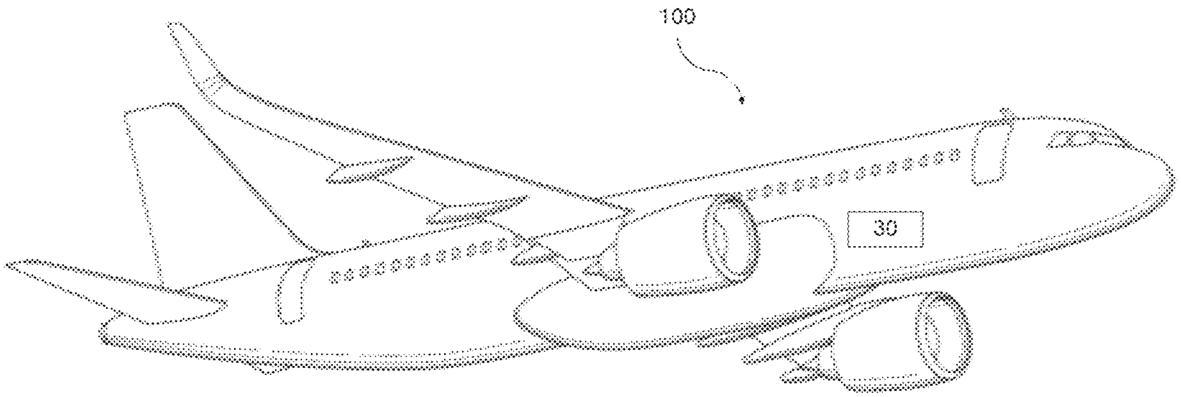
FIG. 8 is an aircraft in which the tank described herein may be installed.

FIG. 8 illustrates an aircraft 100. According to one application, at least one aircraft 100 comprises at least one tank 30 used to store a fluid in the cryogenic state, such as hydrogen. Of course, the invention is not limited to this application.

The first connection system 36 comprises a tubular interface 38 passing through the outer and inner enclosures 32, 34, connected thereto and having a first end 38.1 opening out to the outside of the outer enclosure 32, and a second end 38.2 opening out to the inside of the inner enclosure 34, each of the outer and inner enclosures 32, 34 comprising a through-hole 32.1, 34.1 to allow the tubular interface 38 to pass through. The tubular interface 38 has an axis of revolution A38 parallel to the longitudinal direction.

According to one configuration, the first connection system 36 comprises, for the inner enclosure 34, two L-shaped flanges 40, 40' positioned on either side of the inner enclosure 34, each flange 40, 40' comprising a first wing 40.1, 40.1' pressed against the inner enclosure 34 and connected to the latter, and a second wing 40.2, 40.2' pressed against the tubular interface 38 and connected to the latter. The first connection system 36 also comprises, for the outer enclosure 32, a flange 40 positioned outside the outer enclosure 32, comprising a first wing 40.1 pressed against the outer enclosure 32 and connected to the latter, and a second wing 40.2 pressed against the tubular interface 38 and connected to the latter. Of course, the invention is not limited to this configuration for the connections between the tubular interface 38 and the outer and inner enclosures 32, 34.

The first connection system 36 comprises a first closure plate 42.1 closing the first end 38.1 of the tubular interface 38, and a second closure plate 42.2 closing the second end 38.2 of the tubular interface 38. According to one configuration, the tubular interface 38 comprises a first collar 44.1 at its first end 38.1, and a second collar 44.2 at its second end 38.2, each of the first and second collars 44.1, 44.2 having a contact face F44.1, F44.2, positioned in a transverse plane perpendicular to the axis of revolution A38, against which the corresponding closure plate 42.1, 42.2 is pressed.

Each of the first and second closure plates 42.1, 42.2 is in the form of a disk and comprises at least one attachment zone 46 connected, directly or indirectly, to the outer or inner enclosure 32, 34. At the level of the attachment zones 46, each closure plate 42.1, 42.2 is pressed against the contact face F44.1, F44. 0.2 are rigid. According to one configuration, each attachment zone 46 is in the form of a ring.

Each of the first and second closure plates 42.1, 42.2 comprises a first face F42.1, F42.2 configured to be pressed against the contact face F44.1, F44.2 of the corresponding first or second collar 44.1, 44.2, and a second face F42.1', F42.2' opposite the first face F42.1, F42.2. Each of the first and second closure plates 42.1, 42.2 has an axial direction DA substantially perpendicular to the first face F42.1, F42.2. When fixed to the tubular interface 38, the first and second closure plates 42.1, 42.2 are substantially parallel to each other and perpendicular to the longitudinal direction. For each of the first and second closure plates 42.1, 42.2, the axial direction DA is parallel to the longitudinal direction.

Of course, the invention is not limited to this embodiment for the tubular interface 38.

The tank 30 comprises at least one duct 48 which passes through the first and second closure plates 42.1, 42.2 and which comprises a first end 48.1 opening out to the outside of the outer enclosure 32, and a second end 48.2 opening out into the inner enclosure 34.

For each duct 48, the first closure plate 42.1 comprises a first orifice 50.1 to allow the duct 48 to pass through said first closure plate 42.1, and a first connection zone 52.1 which surrounds the first orifice 50.1 and comprises a first connection 54.1 connecting the duct 48 and the first closure plate 42.1. At the level of the first orifice 50.1, each duct 48 has an axis of revolution A48 parallel to the axial direction DA.

For each duct 48, the second closure plate 42.2 comprises a second orifice 50.2 to allow the duct 48 to pass through said second closure plate 42.2, and a second connection zone 52.2 which surrounds the second orifice 50.2 and comprises a second connection 54.2 connecting the duct 48 and the second closure plate 42.2. At the level of the second orifice 50.2, each duct 48 has an axis of revolution A48 parallel to the axial direction DA.

The first and second connections 54.1, 54.2 are rigid connections. Consequently, the first and second connection zones 52.1, 52.2 are substantially rigid. Each of the first and second connections 54.1, 54.2 is a leaktight connection providing fluid tightness between the duct 48 and the first or second closure plate 42.1, 42.2. By way of example, each of the first and second connections 54.1, 54.2 comprises at least one weld seam surrounding the duct 48 and providing a sealed connection between the latter and the closure plate 42.1, 42.2. Of course, the invention is not limited to this embodiment for the first and second rigid connections 54.1, 54.2. By way of example, the first or second connection 54.1, 54.2 could be in the form of a flange.

According to one feature, at least one wall 56 of the first and second closure plates 42.1, 42.2 comprises at least one deformable zone 58 interposed between the attachment zone 46 and the first or second connection zone 52.1, 52.2 and configured to allow the first or second connection zone 52.1, 52.2 to move with respect to the attachment zone 46 in the axial direction DA. According to one configuration, the deformable zone 58 is configured to deform elastically. Apart from the deformable zones 58, each of the first and second faces F42.1, F42.2, F44.1', F44.2' of the first and second closure plates 42.1, 42.2 is located in a transverse plane perpendicular to the axial direction DA, whereas in each deformable zone it is offset in the axial direction with respect to this transverse plane.

According to one arrangement, the wall 56 comprises, for each connection zone 52.1, 52.2, a deformable zone 58 surrounding the connection zone 52.1, 52.2.

According to another arrangement shown in FIGS. 3 to 7, the wall 56 comprises a deformable zone 58 surrounding a plurality of connection zones 52.1, 52.2.

According to one embodiment, each deformable zone 58 describes a circle. According to one configuration, the deformable zone 58 and the attachment zone 46 are concentric, and the deformable zone 58 surrounds all the connection zones 52.1, 52.2.

According to one embodiment, the deformable zone 58 comprises at least one undulation which describes a circle. According to one arrangement, the deformable zone 58 comprises a plurality of concentric undulations forming a bellows.

Figure 6:
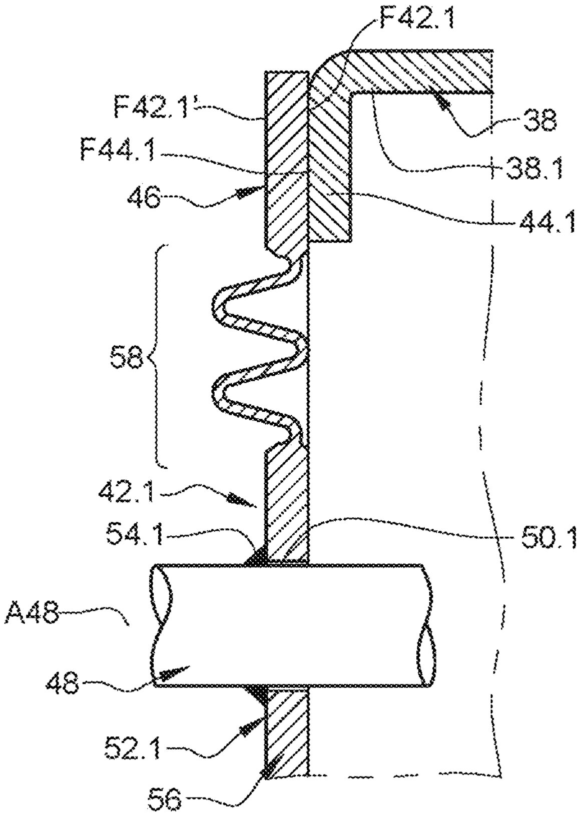
FIG. 6 is a cross section of a part of the closure plate shown in FIG. 5, illustrating a detail of said plate, and, FIG. 7 is a perspective view of a connection system, connecting outer and inner enclosures of a tank, illustrating another embodiment of the invention.

According to an embodiment shown in FIG. 6, the wall 56 has a first thickness outside the deformable zone(s) 58 and a second thickness, less than the first thickness, in each deformable zone 58.

According to one arrangement, only one wall 56 of the first and second closure plates 42.1, 42.2 comprises at least one deformable zone 58.

According to another arrangement, each of the first and second closure plates 42.1, 42.2 comprises at least one deformable zone 58.

According to one operating mode, the first and second closure plates 42.1, 42.2 are obtained by stamping.

In operation, the outer enclosure 34 and the first closure plate 42.1 are in contact with an environment at ambient temperature, while the inner enclosure 34, the second closure plate 42.2 and the segment of the duct 48 situated in the inner enclosure 34 are in contact with a fluid at a cryogenic temperature, much lower than the ambient temperature. This temperature difference causes a deformation of at least one element from among the outer and inner enclosures 32, 34, the duct 48 and the first and second closure plates 42.1, 42.2, which deformation tends to modify the spacing between the first and second closure plates 42.1, 42.2 at the first and second orifices 50.1, 50.2. Since at least one of the closure plates 42.1, 42.2 comprises at least one deformable zone 58, the connection zone 52.1, 52.2 surrounding each duct 48 can move in the axial direction DA with respect to the tubular interface 38 and compensate for the dimensional variation between the first and second closure plates 42.1, 42.2, thereby making it possible to limit the stresses on the first and second connections 54.1, 54.2 and to reduce the risks of damage to said first and second connections 54.1, 54.2.

On the other hand, this temperature difference causes different deformations of the tubular interface 38 and of at least one of the first and second closure plates 42.1, 42.2. The differences in deformation are all the more considerable the more different the materials of the tubular interface and of the closure plates, for example when the tubular interface 38 is made of a composite material and the closure plates are metallic. The fact that a closure plate 42.1, 42.2 comprises at least one deformable zone 58 allows radial deformations of said closure plate, which makes it possible to compensate for the differences in deformation between this closure plate and the tubular interface.

According to one embodiment, the tank 30 comprises a plurality of ducts 48, 48', 48" which pass through the first and second closure plates 42.1, 42.2.

According to an embodiment shown in FIGS. 2 to 6, each duct 48, 48', 48" is rectilinear.

According to another embodiment, shown in FIG. 7, each duct 48, 48', 48" comprises an intermediate segment 60 situated between the first and second closure plates 42.1, 42.2. For at least one of the ducts 48, 48', 48", the intermediate segment 60 has a curved axis A48 and an excess length between said first and second closure plates 42.1, 42.2. This excess length of the intermediate segment 60 of the duct 48 makes it possible to compensate for the dimensional variation between the first and second closure plates 42.1, 42.2, to limit the stresses on the first and second connections 54.1, 54.2, and to reduce the risks of damage to said first and second connections 54.1, 54.2.

According to one configuration, the axis A48 of the intermediate segment 60 follows a trajectory in the form of a circular helix at least between the first and second closure plates 42.1, 42.2.

According to one arrangement, the first and second closure plates 42.1, 42.2 are substantially parallel to each other and angularly offset by about 180°. Consequently, if the first orifice 50.1 of the first closure plate 42.1 traversed by a duct 48 is situated at 6 o'clock, then the second orifice 50.2 of the second closure plate 42.1 traversed by the same duct 48 is situated at 12 o'clock.

When a plurality of ducts 48, 48', 48" passing through the first and second closure plates 42.1, 42.2 are present, each of them comprises an intermediate segment 60, 60', 60" which has a curved axis A48, A48', A48". All the intermediate segments 60, 60', 60" follow trajectories in the form of a circular helix having approximately the same helix axis, at least between the first and second closure plates 42.1, 42.2.

Of course, the invention is not limited to the embodiments described above. The first and second closure plates 42.1, 42.2 could be positioned in line with the walls of the outer and inner enclosures 32, 34, respectively Whatever the embodiment, the tank 30 comprises a first wall 42.1 connected to the outer enclosure 32 at at least one attachment zone 46, a second wall 42.2 connected to the inner enclosure 34 at at least one attachment zone 46, and at least one duct 48 passing through the first and second walls 42.1, 42.2. For each duct 48, the first and second walls 42.1, 42.2 respectively comprise first and second orifices 50.1, 50.2 to allow the duct 48 to pass through the first and second walls 42.1, 42.2. In addition, the tank 30 comprises, for each duct 48 and each of the first and second walls 42.1, 42.2, a connection zone 52.1, 52.2 which surrounds the first or second orifice 50.1, 50.2 and which comprises a connection 54.1, 54.2 connecting the duct 48 and the first or second wall 42.1, 42.2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:

an outer enclosure, an inner enclosure positioned in the outer enclosure, first and second connection systems connecting the outer and inner enclosures, a first wall connected to the outer enclosure, the first wall including a first outer side surface facing the outer enclosure, a second wall connected to the inner enclosure, the second wall including a second outer side surface facing the inner enclosure, wherein the first and second walls at least partly separate the outer enclosure from the inner enclosure, and at least one duct passing through the first and second walls, wherein each of the first and second walls have (a) at least one attachment zone connected to the inner or outer enclosure, and b), for each duct, an orifice through which the duct passes, and (c) a connection zone surrounding the orifice and comprising a connection connecting the duct and the first or second wall, wherein the first and second walls each comprise at least one deformable zone interposed between the at least one attachment zone and the connection zone, the at least one deformable zone configured to allow the connection zone to move with respect to the at least one attachment zone.

2. The tank as claimed in claim 1, wherein each deformable zone forms a circle.

3. The tank as claimed in claim 2, wherein each deformable zone comprises at least one undulation forming the circle.

4. The tank as claimed in claim 3, wherein each deformable zone comprises a plurality of concentric undulations forming a bellows the plurality of concentric undulations including two or more of the at least one undulation.

5. The tank as claimed in claim 1, wherein the first and second walls each have a first thickness outside the at least one deformable zone and a second thickness, less than the first thickness, in each deformable zone.

6. The tank as claimed in claim 1, wherein the first and second walls each comprise the at least one deformable zone surrounding the respective connection zone for each duct on the first and second walls.

7. The tank as claimed in claim 1, wherein the first and second walls each comprise the at least one deformable zone surrounding a plurality of connection zones.

8. The tank as claimed in claim 7, wherein the at least one attachment zone forms a ring, and wherein the at least one deformable zone and the at least one attachment zone are concentric, the at least one deformable zone surrounding all the connection zones.

9. The tank as claimed in claim 1, wherein the first connection system comprises:

a tubular interface passing through the outer and inner enclosures, connected thereto and having a first end opening out to an outside of the outer enclosure, and a second end opening out to an inside of the inner enclosure, a first closure plate closing the first end of the tubular interface and comprising a first deformable zone, and, a second closure plate closing the second end of the tubular interface and comprising a second deformable zone.

10. The tank as claimed in claim 1, wherein each duct comprises an intermediate segment situated between the first and second walls and having a length greater than a distance between said first and second walls.

11. The tank as claimed in claim 10, wherein each intermediate segment has a curved path which follows a trajectory of a circular helix.

12. The tank as claimed in claim 11, wherein the at least one duct includes:

a plurality of ducts passing through the first and second walls, the helical trajectories of the intermediate segments of different ducts having approximately the same helix axis.

13. The tank as claimed in claim 11, wherein the curved path of the intermediate segment follows the trajectory of the circular helix with a rotation of less than 360 degrees.

14. An aircraft comprising:

the tank of claim 1.

* * * * *